(12) United States Patent
Fisher et al.

(10) Patent No.: US 6,911,254 B2
(45) Date of Patent: Jun. 28, 2005

(54) INFRARED ABSORBING COMPOSITIONS AND LAMINATES

(75) Inventors: W. Keith Fisher, Suffield, CT (US); Paul D. Garrett, Sturbridge, MA (US); Howard D. Booth, Jr., Westfield, MA (US); James R. Moran, Longmeadow, MA (US)

(73) Assignee: Solutia, Inc., St. Louis, MO (US)

( * ) Notice: Subject to any disclaimer, the term of this patent is extended or adjusted under 35 U.S.C. 154(b) by 0 days.

(21) Appl. No.: 10/147,720

(22) Filed: May 16, 2002

(65) Prior Publication Data

US 2003/0054160 A1 Mar. 20, 2003

Related U.S. Application Data

(63) Continuation-in-part of application No. 09/993,123, filed on Nov. 14, 2001, now Pat. No. 6,620,872.
(60) Provisional application No. 60/249,449, filed on Nov. 20, 2000, and provisional application No. 60/248,324, filed on Nov. 14, 2000.

(51) Int. Cl.$^7$ .................................................. B32B 5/16
(52) U.S. Cl. ....................... 428/328; 428/407; 428/427; 428/430; 428/432; 428/437; 428/458; 523/137; 524/403; 524/404; 524/409; 524/413
(58) Field of Search ................................ 428/328, 407, 428/427, 432, 437, 430, 458; 524/403, 404, 409, 413; 523/137

(56) References Cited

U.S. PATENT DOCUMENTS

| | | |
|---|---|---|
| 2,904,844 A | 9/1959 | Smithies |
| 2,909,810 A | 10/1959 | Jensch |
| 3,841,890 A | 10/1974 | Coaker et al. |
| 3,994,654 A | 11/1976 | Chyu |
| 4,144,217 A | 3/1979 | Snelgrove et al. |
| 4,225,468 A | 9/1980 | Donohue et al. |
| 4,281,980 A | 8/1981 | Hoagland et al. |
| 4,575,540 A | 3/1986 | Cartier |
| 5,013,779 A | 5/1991 | Fariss et al. |
| 5,079,193 A | 1/1992 | Donohue |
| 5,137,954 A | 8/1992 | DasGupta et al. |
| 5,518,810 A | 5/1996 | Nishihara et al. |
| 5,807,511 A | 9/1998 | Kunimatsu et al. |
| 5,830,568 A | 11/1998 | Kondo |
| 6,315,848 B1 | 11/2001 | Kondo |
| 6,319,613 B1 | 11/2001 | Takeda et al. |
| 6,329,061 B2 | 12/2001 | Kondo |
| 6,620,872 B2 * | 9/2003 | Fisher ........................ 524/403 |
| 6,737,159 B2 * | 5/2004 | Garrett et al. .............. 428/332 |

FOREIGN PATENT DOCUMENTS

| | | |
|---|---|---|
| EP | 0185863 | 7/1986 |
| EP | 0727306 | 8/1996 |
| EP | 1008564 | 6/2000 |
| JP | 200108920 | 3/2001 |

* cited by examiner

Primary Examiner—Judy M. Reddick
(74) Attorney, Agent, or Firm—Fitzpatrick, Cella, Harper & Scinto

(57) ABSTRACT

Laminates are disclosed having interlayers containing an infrared absorbing amount of lanthanum hexaboride (LaB$_6$) coated on or dispersed in a thermoplastic polymeric matrix. Preferably, the LaB$_6$ is combined with other materials, such as indium tin oxide, antimony tin oxide, organic dyes or pigments in a polymeric matrix of polyvinyl butyral (PVB). Alternatively, LaB$_6$ is coated on a sheet of polyethylene terephthalate and encapsulated with one or more sheets of PVB. The interlayers having LaB$_6$ dispersed therein or coated thereon are advantageously combined with encapsulation layers, reflective layers, dyed layers and/or pigmented layers.

21 Claims, 3 Drawing Sheets

INFRARED ABSORBING COMPOSITIONS AND LAMINATES

This application is a continuation-in-part of application Ser. No. 09/993,123, filed Nov. 14, 2001, now U.S. Pat. No. 6,620,872 B2 which claims the benefit of U.S. Provisional Application No. 60/249,449, filed Nov. 20, 2000 and U.S. Provisional Application No. 60/248,324, filed Nov. 14, 2000, all of which are incorporated herein by reference.

BACKGROUND OF THE INVENTION

1. Field of the Invention

The present invention relates to infrared (IR) absorbing compositions and laminates. The compositions are in sheet form and contain lanthanum hexaboride ($LaB_6$) dispersed in a thermoplastic polymeric matrix, together with other light attenuating components such as, without limitation, indium tin oxide, antimony tin oxide, organic dyes, and pigments.

The laminates are multilayer structures having at least one polymeric interlayer with $LaB_6$ dispersed therein or coated thereon, alone or with other light absorbing components, and at least one additional interlayer such as an encapsulating layer, a dyed or pigmented layer, and/or a reflective layer.

2. Related Background Art

Polyvinyl butyral (PVB) resin sheet is used in light-transmitting laminates containing one or more rigid layers, such as glass, for applications such as automotive and architectural glazings, show cases, and protective glass for pictures, documents and the like. The PVB sheet absorbs energy and prevents disintegration when, for example, the head of a vehicle occupant strikes the rigid layer of a laminated window after a sudden stop or a foreign object is propelled against the outside of the laminate.

Glazings, including laminated glazings, tend to transmit heat energy. This can be particularly problematic in a confined area, such a vehicle passenger compartment or office, because of potential overheating of the confined area. Thus many techniques have been developed in an attempt to control heat transmission through glazings.

A conventional heat shielding transparent composite may comprise a very thin layer of reflective metal such as aluminum or silver which is deposited on a transparent substrate by vacuum deposition or sputtering techniques. This technique is limited on vehicle and building windows because the film thickness must be extremely thin. In addition, metallic layers may also suffer from corrosion problems.

It is known that nanoparticles of various inorganic oxides, can be dispersed within a resin binder to form coatings that absorb particular wavelength bands of infrared energy and allow high levels of transmission of visible light. In particular, U.S. Pat. No. 5,807,511 discloses that antimony doped tin oxide (ATO) has a very low transmission to infrared light having wavelength exceeding 1400 nm. U.S. Pat. No. 5,518,810 describes coatings containing tin doped indium oxide (ITO) particles that substantially block infrared light having wavelength above 1000 nm, and that the crystal structure of ITO can be modified to block light having wavelengths of down to 700–900 nm.

U.S. Pat. No. 5,830,568 describes a laminated glass with an interlayer film containing functional ultra-fine particles that provide heat insulation, ultraviolet ray absorption and maintenance of sufficient radio transmittance. The preferred interlayer film is polyvinyl butyral or ethylene-vinyl acetate copolymer. The exemplified ultra-fine particles include antimony tin oxide and indium tin oxide.

EP-A-1008564 discloses the use of an infrared blocking coating composition which contains both ATO or ITO, and metal hexaboride such as $LaB_6$. The ATO or ITO blocks the higher wavelengths of infrared light and the metal hexaboride particles block the lower wavelengths of light. The coating may be applied to polymeric film substrates. There is no disclosure or suggestion, however, of employing metal hexaboride as a nanoparticulate dispersion in a PVB composition, particularly for use as an interlayer sheet in a glass laminate.

SUMMARY OF THE INVENTION

In one aspect, the invention is a laminate transparent to visible light and absorbing light in the infrared region of the spectrum. In embodiments, the laminate comprises at least one substrate, a reflective film, and an infrared absorbing sheet having an infrared absorbing amount of lanthanum hexaboride nanoparticles dispersed in a thermoplastic polymeric matrix. The reflective film may be selected from commercially available multilayer reflective films and metallized polyethylene terephthalate films. Although it is contemplated that many thermoplastic polymeric material may be used as interlayer materials according to the invention, the preferred thermoplastic matrix is polyvinyl butyral (PVB).

In other embodiments, the laminate according to the invention comprises at least one substrate, a thermoplastic polymeric sheet (such as a polyethylene terephthalate sheet) having a coating of lanthanum hexaboride nanoparticles (with or without other light absorbing components), and at least one encapsulating layer of thermoplastic polymeric material encapsulating said coated sheet.

The substrates are typically rigid sheets transparent to visible light, such as clear or tinted glass sheets. Preferably two glass sheets are used, and the reflective film and the infrared absorbing film are interposed between the glass sheets to form a laminate. Other light absorbing components may be combined with the lanthanum hexaboride nanoparticles, whether dispersed or used in a coating, including indium tin oxide, antimony tin oxide, dyes and pigments. These additional components also may be provided in additional layers in a multilayer laminate.

DETAILED DESCRIPTION OF THE INVENTION

Figure 1:
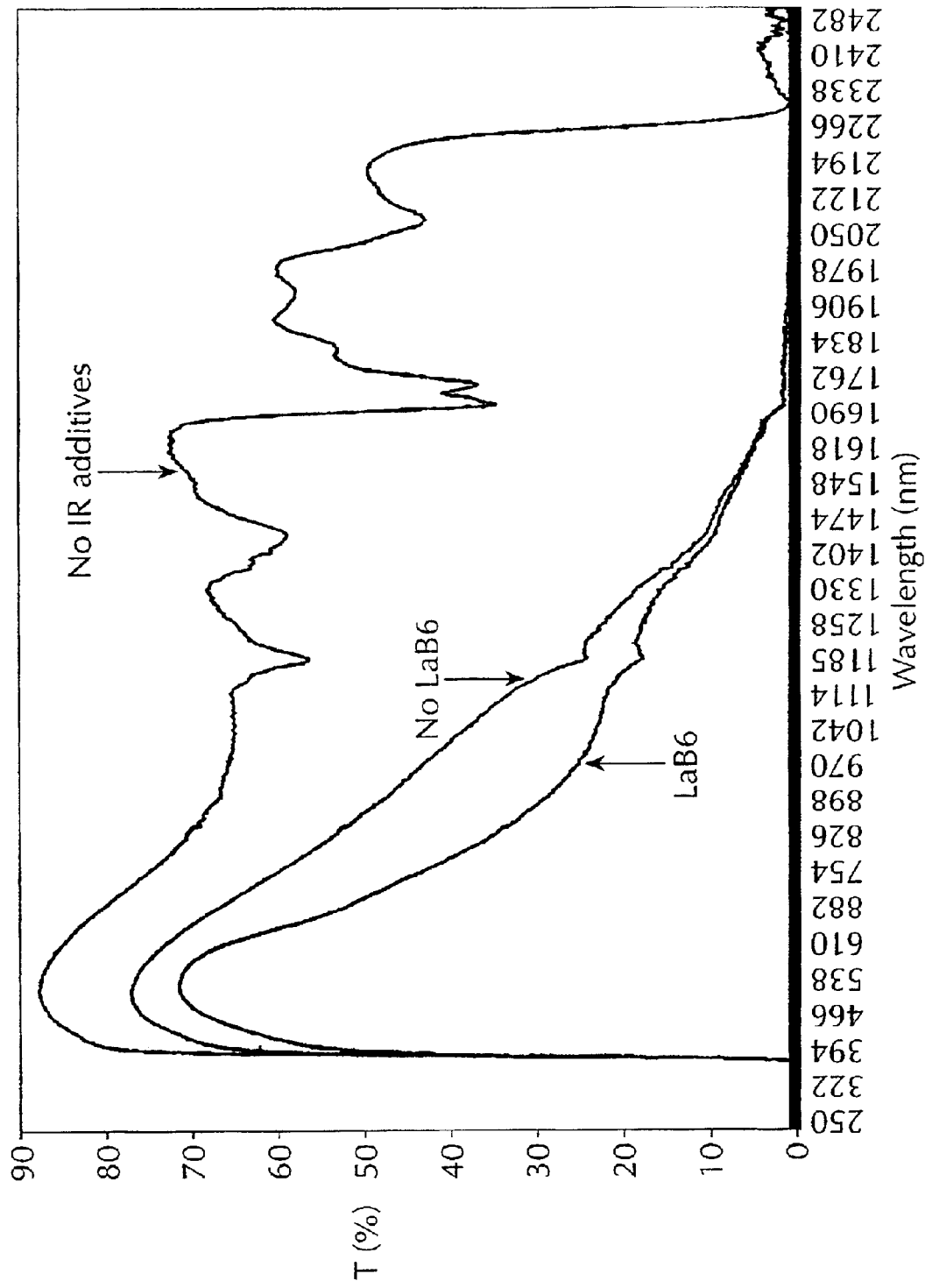
FIG. 1 is a transmission spectra indicating the effect of $LaB_6$ on clear glass laminates having a polyvinyl butyral interlayer containing 0.45% antimony tin oxide. More specifically, the line labeled "$LaB_6$" is the transmission spectrum of a glass laminate having a polyvinyl butyral interlayer containing 0.01% $LaB_6$ and 0.45% antimony tin oxide; the line labeled "No $LaB_6$" is the transmission spectrum of a glass laminate having a polyvinyl butyral interlayer containing 0.45% antimony tin oxide; and the line labeled "No IR additives" is the transmission spectrum of a laminate having a polyvinyl butyral interlayer containing no $LaB_6$ and no antimony tin oxide.
Figure 2:
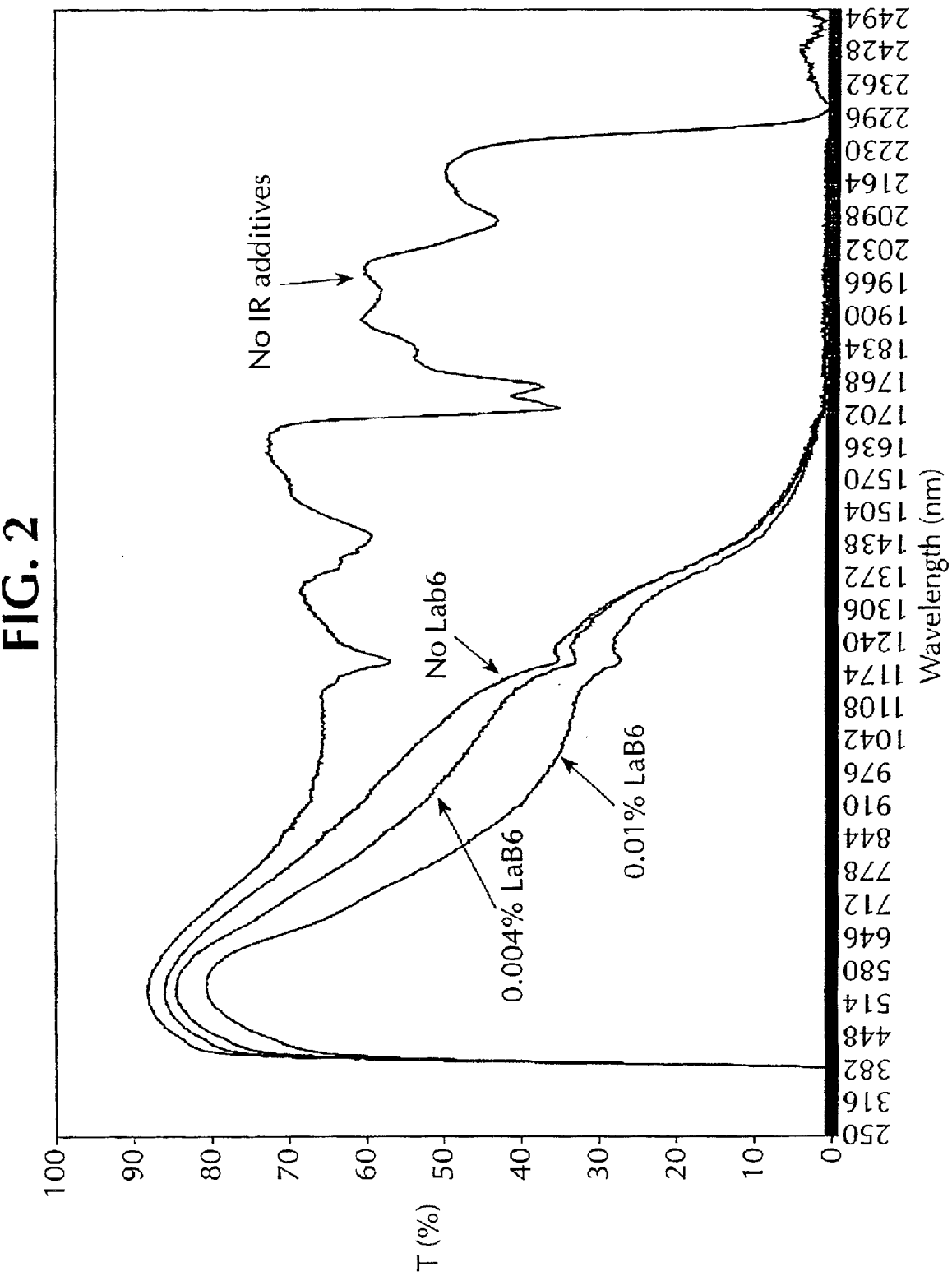
FIG. 2 is a transmission spectra indicating the effect of $LaB_6$ on clear glass laminates having a polyvinyl butyral interlayer containing 0.2% indium tin oxide. More specifically, the lines labeled "0.01% $LaB_6$" and "0.004% $LaB_6$" are the transmission spectra of glass laminates having a polyvinyl butyral interlayer that respectively contain (i) 0.2% indium tin oxide and 0.01% $LaB_6$ and (ii) 0.2% indium tin oxide and 0.004% $LaB_6$; the line labeled "No $LaB_6$" is the transmission spectrum of a glass laminate having a polyvinyl butyral interlayer containing 0.2% indium tin oxide; and the line labeled "No IR additives" is the transmission spectrum of a laminate having a polyvinyl butyral interlayer containing no $LaB_6$ and no indium tin oxide.

"Interlayer materials" as used herein refers to a sheet of material which can be interposed between substrates to form a laminate.

"Interlayer matrix material" refers to a thermoplastic polymeric material which has other components doped therein which affect the transmittance of visible or infrared light. The doping components can be, without limitation, lanthanum hexaboride, indium tin oxide, antimony tin oxide, spectrally selective infrared absorbing organic dyes and pigments. The preferred interlayer matrix material is polyvinyl butyral.

"Laminate" includes structures having one substrate (i.e. glazings) and structures having two substrates with interlayers interposed between them.

"Light attenuating" refers to any effect on the transmission of incident light, including absorption in the infrared region of the spectrum, absorption in the visible spectrum, and reflectance.

The thermoplastic polymeric interlayer materials of this invention contain an infrared (IR) absorbing effective amount of lanthanum hexaboride ($LaB_6$) either alone or in combination with at least one of indium tin oxide (ITO) and antimony tin oxide (ATO). If the lanthanum hexaboride is used alone as an IR absorbing agent then generally it will be present in the polymeric interlayer material in an amount of about 0.001% to about 0.1%, preferably about 0.01% to about 0.05%, and most preferably about 0.01% to about 0.04% percent by weight of the composition.

$LaB_6$ is an effective near IR (NIR) absorber, with an absorption band centered on 900 nm. When incorporated into polymer sheet, the absorption region of $LaB_6$ is complementary to, and can be used in conjunction with, nanoparticulate absorbers such as ITO and ATO. When $LaB_6$ is used in combination with at least one of ITO or ATO as the IR absorbers, then the $LaB_6$ will typically be present in the polymeric matrix material in an amount of about 0.001% to about 0.1%, preferably about 0.004% to about 0.05%, and most preferably about 0.006% to about 0.02% percent by weight of the composition.

In a preferred embodiment, ITO, ATO, or a mixture thereof will be present in a polymeric matrix material of polyvinyl butyral in an amount of about 0.05% to about 2.0%, preferably about 0.1% to about 1.0%, and most preferably about 0.1% to about 0.5% percent by weight of the composition, together with $LaB_6$.

When a mixture of ITO and ATO is used, the weight ratio of ITO to ATO is generally about 90:10 to about 10:90, and preferably about 70:30 to about 30:70.

In embodiments, the $LaB_6$, ITO, ATO and other components are dispersed at low concentrations throughout a polymeric matrix. Accordingly, the $LaB_6$, ITO, and ATO must be present in the form of fine particles which do not interfere with the visual transmission through the sheet. Preferred particles are nanoparticles which typically have a particle size less than 200 nm and most preferably in a range of 5 nm to 100 nm. Other components, such as dyes or pigments that are intended to affect the visual transmission through the sheet, by absorbing at a particular wavelength of the visible spectrum and imparting color for example, may also be included. ITO or ATO may be present as a coating on glass, such as commercially available low e hard coat glass.

In other embodiments, $LaB_6$, alone or in combination with other nanoparticulate absorbers such as ITO or ATO, can be coated onto a polymeric interlayer material, or onto glass, which is then encapsulated with an additional polymeric interlayer material or between two additional interlayers. In a preferred embodiment, a combination of nanoparticulate $LaB_6$ with other nanoparticulate infrared absorbing materials is coated onto a polyethylene terephthalate (PET) sheet, which is encapsulated with at least one sheet of polyvinylbutyral and interposed between glass sheets to form a laminate.

In embodiments, organic dyes and/or pigments are used in combination with $LaB_6$ to modify the color of the interlayer. The dyes or pigments can be combined with $LaB_6$ in the same sheet or can be in a separate sheet, laminated together with the $LaB_6$-containing sheet. Color-adjusting dyes and pigments also provide some improvement in solar attenuating performance. An example of an infrared absorbing dye is available under the tradename Epolight made by Epolin of Newark, N.J.

A typical formulation to achieve a gray color contains $LaB_6$ in an amount of about 0.014 percent by weight, blue pigment in a range of about 0.0015 to about 0.0080 percent by weight, for example about 0.0045 percent by weight, red pigment in a range of about 0.0050 to about 0.0150 percent by weight, for example about 0.011 percent by weight, and black pigment in an range of up to about 0.0040 percent by weight, for example about 0.00064 percent by weight.

A typical formulation to achieve a green color contains $LaB_6$ in an amount of about 0.009 percent by weight, blue pigment in a range of about 0.0005 to about 0.0035 percent by weight, for example about 0.0014 percent by weight, green pigment in a range up to about 0.0015 percent by weight, for example about 0.00026 percent by weight, and yellow pigment in a range of up to about 0.0008 percent by weight.

All pigment weight percentages are with respect to the PVB sheet. Such specific ranges and formulations are not to be considered limiting of the invention. Appropriate ranges and modifications of those ranges may be selected without undue experimentation.

Any polymeric material conventionally used in laminate manufacture may be used as an interlayer matrix material in this invention. Polyvinyl butyral (PVB) is by far the best known and most preferred interlayer matrix material. The PVB composition of this invention is used to make visually transparent sheets of PBV and visually transparent glass laminates containing such PVB sheet as an interlayer.

Interlayers containing $LaB_6$, alone or in combination with other absorbers, can be used in conjunction with reflective films in multilayer structures. A preferred reflective film is metallized polyethylene terephthalate (PET), which can be embossed with a pattern, such as a "bexpin" pattern to enhance its aesthetic appeal. Alternatively, a multilayer spectrally selective solar reflective film may be used. The $LaB_6$ can be dispersed in one or more sheets of polymeric matrix material, which encapsulate the reflective layer on one or both sides, or the $LaB_6$ may be present as a coating used in conjunction with the reflective coating on the reflective film.

$LaB_6$ is also an effective solar control additive in high plasticizer loaded PVB sheet used for acoustic damping applications. This type of sheet combines the desirable properties of solar energy attenuation and acoustic damping. Likewise, laminates according to the invention combine solar radiation attenuation using $LaB_6$ with other desirable functional attributes of PVB interlayers such as, without limitation, flame retardance, decorative designs, colors, etc.

Each of the lanthanum hexaboride, indium tin oxide and antimony tin oxide is preferably introduced into the PVB resin by first forming a dispersion in a PVB compatible solvent, most preferably a plasticizer. It may also be possible to mix the IR absorbing particles into PVB by adding a solvent dispersion of those particles to the reaction mixture of PVOH and butyraldehyde prior to formation of the PVB.

While PVB is the preferred resin used in the present invention it should be recognized that other polymers which may be used to form interlayer sheets of glass laminates could be substituted for PVB. Generally, PVB resin has a weight average molecular weight greater than 70,000, preferably about 100,000 to 250,000, as measured by size exclusion chromatography using low angle laser light scattering. On a weight basis PVB typically comprises 15 to 25%, preferably about 16 to 19% hydroxyl groups calculated as polyvinyl alcohol (PVOH); 0 to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Solutia Incorporated, St. Louis, Mo. as Butvar® resin.

Preferably, the PVB resin used in the sheet of this invention is plasticized PVB. Plasticized PVB as sheet at a non-critical thickness of about 0.13 to 1.3 mm is formed by mixing resin and plasticizer and preferably (in commercial systems) extruding the mixed formulation through a sheet die, i.e., forcing molten, plasticized PVB through a horizontally long vertically narrow die opening substantially conforming in size to the sheet being formed, or by casting molten polymer issuing from an extrusion die onto a die roll in close proximity to the die exit to impart desired surface characteristics to one side of the polymer. When the roll surface has minute peaks and valleys, the side of the sheet contacting the roll will have a rough surface generally conforming to the valleys and peaks. Roughness on the other side can be provided by the design of the extrudate die opening as shown, for example, in FIG. 4 of U.S. Pat. No. 4,281,980. Other known techniques for producing a rough surface on one or both sides of an extruding sheet involve specifying and controlling one or more of the following: polymer molecular weight distribution, water content and temperature of the melt. These techniques are disclosed in U.S. Pat. Nos. 2,904,844; 2,909,810; 3,994,654; 4,575,540 and European Patent No. 185,863. Embossing downstream of the extrusion die also roughens the sheet surface. As known, this roughness is temporary to facilitate deairing during laminating after which the elevated temperature and pressure during bonding of the sheet to glass melts it smooth. Lamination to glass is according to generally known procedures.

Sheets of the present invention may optionally contain additives (other than IR absorbers) to enhance performance such as ultraviolet light stabilizers, antioxidants, adhesion control agents and the like. Preferred adhesion control agents are salts of potassium, sodium, magnesium and calcium, present in amount customary in the art, which depends on the type of interlayer material used, the substrate used, etc.

The PVB resin of the sheet is typically plasticized with about 20 to 80 and more commonly 25 to 60 parts plasticizer per hundred parts of resin. Plasticizers commonly employed are esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers.

The invention is also directed to a glass laminate comprising two sheets of glass with the inventive sheet disposed therebetween. Additional layers may also be disposed between the two sheets of the glass so long as the desired optical properties of the laminate are maintained. The glass sheets may be of any type of glass. Particularly preferred is the use of at least one sheet of glass that is heat absorbing glass, solar reflection glass, low e glass or the like.

This invention will be better understood from the following Examples. However, one skilled in the art will readily appreciate that the specific methods and results discussed are merely illustrative and no limitation is implied. All parts and percentages are by weight unless otherwise specified.

EXAMPLE 1

A polyvinyl butyral composition was prepared by mixing 19 grams of triethyleneglycol bis(2-ethylhexanoate) with 0.32 grams of a 2.2 percent dispersion of lanthanum hexaboride nanoparticles in toluene and then combining this mixture with 50 grams of polyvinyl butyral resin. The resulting composition was blended in a Brabender mixer and pressed to form a 30 mil thick sheet. The sheet was then laminated between two similarly sized sheets of clear glass and pressure was applied to form a laminate. The resulting laminate had a visual transmission of 80 percent and a solar transmission of 62 percent. A similar laminate but containing no lanthanum hexaboride had a visible transmission of 87 percent and a solar transmission of 74 percent. These results show that addition of lanthanum hexaboride substantially reduces solar transmission while maintaining visual transmission at a high level.

EXAMPLE 2

A polyvinyl butyral composition was prepared in a manner similar to Example 1, with the exception that 1.56 grams of a 20 percent dispersion of antimony tin oxide in triethyleneglycol bis(2-ethylhexanoate) was added to the resin along with the lanthanum hexaboride. A sheet was pressed and a laminate made with clear glass having visual transmission of 70 percent and solar transmission of 44 percent.

EXAMPLE 3

A polyvinyl butyral composition was prepared in a manner similar to Example 1, with the exception that 0.462 grams of a 30 percent dispersion of indium tin oxide in triethyleneglycol bis(2-ethylhexanoate) was added to the resin along with the lanthanum hexaboride. A sheet was pressed and a clear glass laminate prepared having visual transmission of 78 percent and solar transmission of 52 percent.

EXAMPLE 4

A polyvinyl butyral sheet was prepared as in Example 3. This sheet was laminated between two sheets of heat absorbing glass (so called green glass). This laminate had visual transmission of 71% and solar transmission of 38%.

EXAMPLE 5

A polyvinyl butyral composition was prepared in a manner similar to Example 1, with the exception that 2 grams of a 20 percent dispersion of a 50:50 mixture of indium tin oxide and antimony tin oxide was added to the resin along with the lanthanum hexaboride. A sheet and laminate were prepared having excellent IR absorbing capacity.

EXAMPLE 6

A polyvinyl butyral composition was prepared by mixing 5.11 grams of 6.3% wt. of $LaB_6$ dispersed in plasticizer triethylene glycol di-(2-ethylhexanoate) with an additional 878.7 grams of triethylene glycol di-(2-ethylhexanoate). This blend of $LaB_6$ and plasticizer was added to 2250 grams of polyvinyl butyral resin and extruded into sheet using a 1.25 inch extruder. The sheet contained 0.01% wt. La B6. The same procedure was used, with appropriate proportions of $LaB_6$ dispersion in plasticizer and additional plasticizer, to make concentrations of 0.015%, 0.02%, 0.025%, and 0.03% wt. $LaB_6$ in polyvinyl butyral sheet. Results of visible and solar transmission of laminates using these sheets between two pieces of 2.3 mm thick clear glass are listed below (solar transmission results were calculated using ISO 9050, air mass 1).

| $LaB_6$ Weight % | Visible Transmittance | Solar Transmittance |
|---|---|---|
| 0 | 89 | 70 |
| 0.01 | 79 | 52 |
| 0.015 | 72 | 44 |
| 0.02 | 67 | 38 |
| 0.025 | 62 | 32 |
| 0.03 | 57 | 28 |

EXAMPLE 7

A polyvinyl butyral composition was prepared by mixing 5.11 grams of 6.3% wt. of $LaB_6$ dispersed in plasticizer triethylene glycol di-(2-ethylhexanoate) with 21.47 grams of a 30% wt. dispersion of indium tin oxide in triethylene glycol di-(2-ethylhexanoate) and an additional 863.7 grams of triethylene glycol di-(2-ethylhexanoate). This blend was added to 2250 grams of polyvinyl butyral resin and extruded into sheet using a 1.25 inch extruder. The sheet contained 0.01% wt. $LaB_6$ plus 0.2% indium tin oxide. The average visible and solar transmission of laminates using these sheets between two pieces of 2.3 mm thick clear glass were 77% (visible transmittance) and 44% (solar transmittance; solar transmission results were calculated using ISO 9050, air mass 1).

EXAMPLE 8

The following Table demonstrates the visible transmittance and solar transmittance of tinted architectural laminates having a combination of pigments dispersed in the interlayer to give a green or gray color compared to a clear control laminate.

| Case # | Color | % $LaB_6$ | Plasticizer Content (phr) | % PVOH | Visible Transmittance | Solar Transmittance |
|---|---|---|---|---|---|---|
| 1 | RB control clear | 0 | 38 | 18.7 | 88.7 | 69.9 |

-continued

| Case # | Color | % LaB$_6$ | Plasticizer Content (phr) | % PVOH | Visible Transmittance | Solar Transmittance |
|---|---|---|---|---|---|---|
| 2 | Lt. Green | 0.01 | 38 | 18.7 | 74.1 | 51.4 |
| 3 | Lt. Green | 0.0073 | 38 | 18.7 | 74.8 | 52.2 |
| 4 | Dk. Gray | 0.02 | 38 | 18.7 | 46.4 | 29.3 |
| 5 | Dk. Gray | 0.014 | 38 | 18.7 | 48.5 | 34.1 |
| 6 | Lt. Green | 0.0073 | 51 | 16.0 | 74.3 | 52.0 |

EXAMPLE 9

The following Table shows the solar near infrared blocking properties of laminates made using PVB sheet containing various combinations of LaB$_6$ and ATO with clear and heat absorbing glass.

| | Clear glass laminates | | Heat absorbing glass laminates | |
|---|---|---|---|---|
| | Visible Transmittance | Solar Transmittance | Visible Transmittance | Solar Transmittance |
| Case 1 No IR additives Control | 88.45 | 69.29 | 80.25 | 51.94 |
| Case 2 0.05% ATO 0.003% LaB$_6$ | 72.70 | 43.18 | 63.76 | 32.36 |
| Case 3 0.05% ATO 0.001% LaB$_6$ | 72.08 | 43.20 | 66.23 | 35.01 |
| Case 4 0.02% ATO 0.003% LaB$_6$ | 78.11 | 49.72 | 71.52 | 39.53 |
| Case 5 0.2% ATO 0.001% LaB$_6$ | 81.17 | 54.67 | 74.56 | 43.10 |
| Case 6 0.35% ATO 0.002% LaB$_6$ | 75.69 | 46.74 | 69.09 | 37.19 |

EXAMPLE 10

The following Table shows performance data for multilayer structures having a metallized PET reflective film combined with other layers. The metallized PET film used in each of Examples 10-1 through 10-4 was embossed with a hexpin pattern. The metallized PET was combined with the following interlayer materials and pressed between clear glass substrates to make a laminate.

The interlayer used in Example 10-1 is a 15 mil thick clear PVB sheet combined with a 30 mil PVB sheet containing 0.0073% LaB$_6$ and a combination of pigments to give a light green color.

The interlayer used in Example 10-2 is a 15 mil thick clear PVB sheet combined with a 30 mil PVB sheet containing 0.014% LaB$_6$ and a combination of pigments to give a gray color.

The interlayer of Example 10-3 is a 15 mil thick clear PVB sheet having 0.36 percent by weight ITO and 0.003 percent by weight LaB$_6$.

The interlayer of Example 10-4 is a PET film coated with LaB$_6$ and ATO encapsulated between two 15 mil thick sheets of clear PVB.

| | | 10-1 | 10-2 | 10-3 | 10-4 |
|---|---|---|---|---|---|
| Visible | % Tv | 27.75% | 19.02% | 31.29% | 27.45% |
| | % Rv (f) | 35.03% | 35.95% | 38.12% | 37.64% |
| | % Rv (b) | 24.70% | 14.95% | 34.71% | 27.24% |
| Solar | % Ts | 17.00% | 11.08% | 19.27% | 15.50% |
| | % Rs (f) | 32.64% | 33.63% | 35.50% | 35.20% |
| | % Rs (b) | 17.54% | 11.49% | 22.93% | 16.24% |
| | Tv/Ts | 1.63 | 1.72 | 1.62 | 1.77 |

EXAMPLE 11

The Table below shows solar rejection data for the following composite interlayers: 11-1 consists of a 15 mil clear PVB layer, Spectra Select® spectrally selective solar reflective film +30 mil thick PVB layer containing 0.01% LaB$_6$ Spectra Select® spectrally selective solar reflective film is PET coated with multi-layers of metal and metal oxides designed to preferentially reflect near infra-red radiation. It is made by CPFilms, a division of Solutia Inc. 11-2 consisted of the Example 8 (Case 3) interlayer without the reflective film. 11-3 consisted of the Example 8 (Case 5) interlayer without the reflective film. In each case, the composite interlayers were laminated between 2.3 mm thick clear glass substrates.

| Laminate | Visible Transmittance | Solar Transmittance | Solar Reflectance |
|----------|----------------------|---------------------|-------------------|
| 11-1 | 56.0 | 26.8 | 19.8 |
| 11-3 | 74.8 | 62.2 | — |
| 11-4 | 48.5 | 34.1 | — |

EXAMPLE 12

Figure 3:
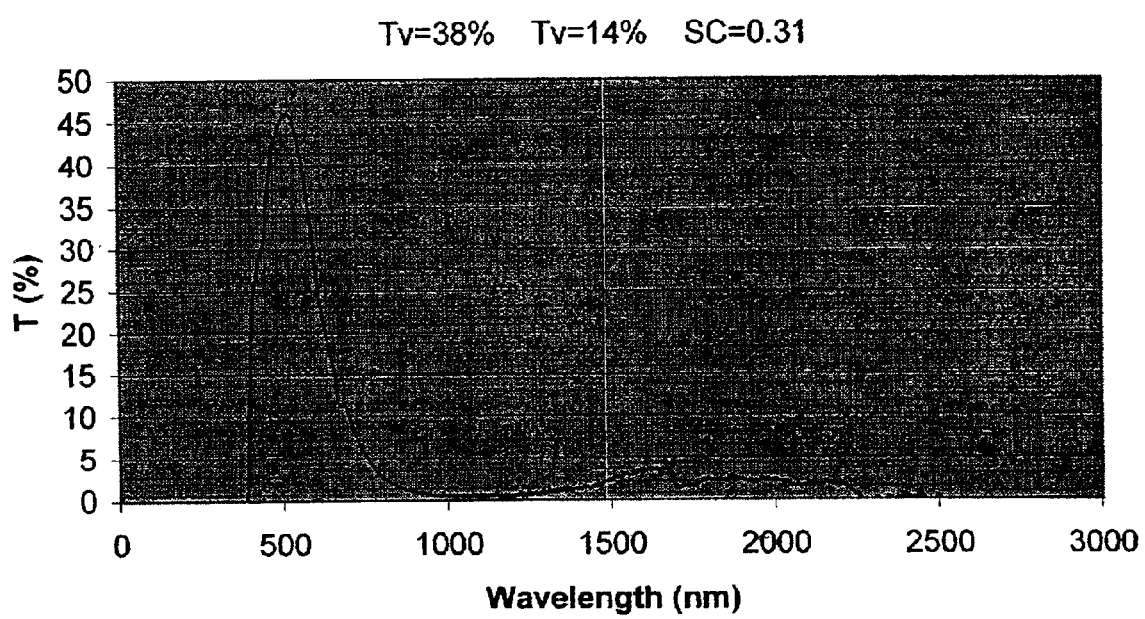
FIG. 3 shows the spectra, transmittance and shading coefficient of a laminate prepared from an interlayer material of Example 8 (Case 3) below pressed between a 6 mm layer of low e glass and a 10 mm layer of tinted glass.

Excellent solar rejection can be achieved by combining various types of solar absorbing and low e glass with $LaB_6$ based solar absorbing sheet. The $LaB_6$ doped PVB interlayer of Case 3 from Example 8 above was combined with a 30 mil clear PVB sheet and was laminated between 10 mm tinted glass and 6 mm low e glass. The spectra, transmittance and shading coefficient are shown in FIG. 3.

Other variations and modifications of this invention will be obvious to those skilled in this art. This invention is not to be limited as except set forth in the following claims.

What is claimed is:

1. A laminate transparent to visible light and absorbing light in the infrared region of the spectrum, comprising
   at least one substrate;
   a reflective film; and
   an absorbing sheet having an infrared absorbing amount of lanthanum hexaboride nanoparticles dispersed in a thermoplastic polymeric matrix.

2. The laminate of claim 1, wherein said reflective film comprises a sheet of metallized polyethylene terephthalate.

3. The laminate of claim 1, wherein said reflective film comprises a multi-layer spectrally selective film.

4. The laminate of claim 1, wherein said absorbing sheet further comprises spectrally selective infrared absorbing organic dyes or pigments dispersed in said thermoplastic polymeric matrix.

5. The laminate of claim 1, further comprising an additional thermoplastic polymeric layer having organic dye or pigment dispersed therein.

6. The laminate of claim 1, wherein said absorbing sheet further comprises indium tin oxide nanoparticles, antimony tin oxide nanoparticles, or mixtures thereof, dispersed in said thermoplastic polymeric matrix.

7. The laminate of claim 1, comprising two rigid substrates transparent to visible light, wherein said reflective film and absorbing sheet are interposed between the two rigid substrates.

8. The laminate of claim 1, wherein said thermoplastic polymeric matrix is polyvinyl butyral and said lanthanum hexaboride nanoparticles have an average size in the range 5 to 200 nm.

9. The laminate of claim 1, further comprising a polyethylene terephthalate film coated with particles selected from the group consisting of lanthanum hexaboride particles, indium tin oxide particles, antimony tin oxide particles, and mixtures thereof.

10. A laminate transparent to visible light and absorbing light in the infrared region of the spectrum comprising:
    a polymer sheet having a coating of lanthanum hexaboride nanoparticles;
    at least one encapsulating layer of thermoplastic polymeric material encapsulating said coated sheet; and
    at least one substrate.

11. The laminate claim 10, wherein said polymer sheet is a polyethylene terephthalate sheet coated with a mixture of lanthanum hexaboride with at least one of indium tin oxide and antimony tin oxide, said at least one encapsulating layer is a polyvinyl butyral encapsulating layer and said polymer sheet and encapsulating layer are interposed between two glass substrates.

12. The laminate of claim 10, wherein said encapsulating layer includes a dispersed organic dye or a dispersed pigment.

13. The laminate of claim 10, further comprising a reflective film.

14. A multilayer structure transparent to visible light and absorbing light in the infrared region of the spectrum, comprising:
    a thermoplastic polymeric layer having lanthanum hexaboride nanoparticles dispersed therein or coated thereon; and
    at least one additional polymeric layer adjacent said thermoplastic polymeric layer.

15. The multilayer structure of claim 14, wherein
    said thermoplastic polymeric layer is a layer of polyvinyl butyral having lanthanum hexaboride particles dispersed therein, and
    said additional polymeric layer is a reflective film of embossed metallized polyethylene terephthalate.

16. The multilayer structure of claim 14, wherein
    said thermoplastic polymeric layer is a layer of polyethylene terephthalate coated with lanthanum hexaboride nanoparticles and at least one of indium tin oxide and antimony tin oxide, and
    said at least one additional polymeric layer comprises a polyvinyl butyral encapsulating layer.

17. The multilayer structure of claim 15, wherein said thermoplastic polymeric layer has dispersed therein, indium tin oxide, antimony tin oxide or a mixture thereof.

18. The multilayer structure of claim 16, wherein said additional polymeric layer comprises an organic dye or pigment.

19. The multilayer structure of claim 16, wherein said at least one additional polymeric layer comprises two layers of polyvinyl butyral encapsulating said coated layer of polyethylene terephthalate.

20. An infrared-absorbing visible light transparent composition in sheet form comprising:
    a polymeric matrix material;
    nanoparticulate lanthanum hexaboride dispersed in the polymeric matrix material; and
    at least one organic dye or pigment that absorbs light in the visible or near infrared region of the spectrum dispersed in the polymeric matrix material.

21. The infrared-absorbing visible light transparent composition in sheet form according to claim 20,
    wherein the polymeric matrix material comprises polyvinyl butyral and the
    nanoparticulate lanthanum hexaboride has an average particle size in the range of 5 to 200 nm and is present in an amount between 0.001 and 0.1 percent by weight of said polymeric matrix material; and wherein the infrared-absorbing visible light transparent composition further comprises
    antimony tin oxide, indium tin oxide or a mixture thereof present in an amount between 0.05 and 2.0 percent by weight of the composition; and
    a light attenuating effective amount of pigment or organic dye.

* * * * *

UNITED STATES PATENT AND TRADEMARK OFFICE
CERTIFICATE OF CORRECTION

PATENT NO. : 6,911,254 B2
DATED : June 28, 2005
INVENTOR(S) : W. Keith Fisher et al.

It is certified that error appears in the above-identified patent and that said Letters Patent is hereby corrected as shown below:

Title page,
Item [56], References Cited, FOREIGN PATENT DOCUMENTS,
"JP   200108920   3/2001" should read -- JP   2001-8920   3/2001 --.

Column 1,
Line 29, "material" should read -- materials --.

Column 4,
Line 53, "an" should read -- a --.

Column 6,
Line 23, "deairing" should read -- de-airing --.

Column 8,
Line 12, "la B6." should read -- $LaB_6$. --.

Column 11,
Line 54, "5 to" should read -- of 5 to --.

Column 12,
Line 1, "laminate claim" should read -- laminate of claim --.

Signed and Sealed this

Twenty-first Day of February, 2006

JON W. DUDAS
*Director of the United States Patent and Trademark Office*